Patented Jan. 24, 1933

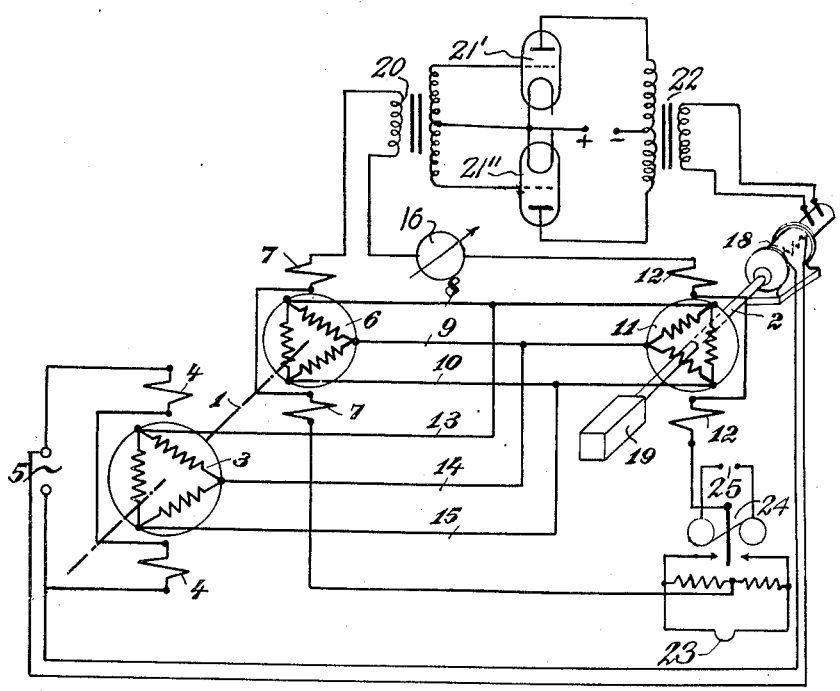

1,895,240

UNITED STATES PATENT OFFICE

JOHANNES VOPEL, OF BERLIN-ZEHLENDORF-MITTE, AND RUDOLF OETKER, OF BERLIN, GERMANY, ASSIGNORS TO GESELLSCHAFT FÜR ELEKTRISCHE APPARATE M. B. H., OF MARIENFELDE NEAR BERLIN, A CORPORATION OF GERMANY

ELECTRICAL DISTANT CONTROL SYSTEM

Application filed June 6, 1931, Serial No. 542,558, and in Germany May 10, 1930.

Our invention relates to apparatus for determining and equalizing differences in the positions of two shafts located at a distance apart, and more particularly to apparatus for the remote supervision and control of objects.

The object of our invention is to provide apparatus of this kind capable of very high adjusting accuracy.

In known apparatus for determining, indicating or measuring and equalizing, compensating or correcting faulty positions, the transmitters and receivers of motor-like construction used for the purpose are mostly so connected, that they act in the manner of electrical differential gears. Thus the movements of the two shafts are, for instance, by means of a transmitter transmitted to a differential receiver, which indicates the difference in the positions or lack of coincidence between the two shafts, or controls a follow-up mechanism for correcting the faulty positions of the shafts by means of a contacting device or by adjusting an electric rheostat. Such apparatus has inherent mechanical or electrical drawbacks which frequently reduce the indication or control accuracy. Usually comparatively heavy transmitters and receivers are required which strongly brake the shafts generally capable of carrying light loads only and furthermore give cause to hunting which, in particular, renders the apparatus unsuitable for the transmission of movements with strongly fluctuating speeds. A further disturbing factor which becomes noticeable is that at high speeds not only the transformer voltage for the adjustment of the receiver is induced in the transmitter armatures but in addition thereto a rotation voltage which causes undesirable voltage displacements and in consequence thereof faulty or incorrect measuring results.

Our invention eliminates all the above recited disadvantages.

According to our invention there are mounted upon one of the shafts located at a distance from the other an induction regulator and upon the other shaft two induction regulators, the armature windings of which are short-circuited amongst themselves. One of the two induction regulators mounted upon one shaft is separately excited, while the stators of the other two induction regulators carry induction windings connected in series. The entire arrangement is such that in the event of a difference in the positions of the two shafts voltages are induced in the induction windings, which are utilized for the indication, registration, equalization or compensation of the faulty positions of both shafts.

An embodiment of our invention is by way of example illustrated in the drawing affixed to and forming part of our specification.

Referring to the single figure of the drawing 1 and 2 are the two shafts located at a distance apart, and the difference in the positions of which are to be measured or equalized. Upon the shaft 1 is mounted the armature 3 provided with a delta winding of an induction regulator or rotary transformer acting as a transmitter, the exciter winding 4 of which regulator is connected to the source of alternating current 5. Upon the shaft 1 there is also mounted the armature 6 of an induction regulator or rotary transformer, the delta winding of which is by leads 8, 9 and 10 connected to the windings of the armature of a third induction regulator or rotary transformer 11 of as similar a construction as possible mounted on the shaft 2. The stator windings 7 and 12 of the two last mentioned induction regulators are connected in series and are not excited from the network. The delta winding of the armature of the transmitter 3 is connected to the leads 8, 9 and 10 by the leads 13, 14 and 15. In one of the connecting leads between the stator windings 7 and 12 connected in series there is connected the oscillograph loop 23. By a synchronously oscillating relay 24, which is connected with a source of alternating current 25 having the same frequency and the same phase as the source of current 5, the alternating current which flows when the shafts 1 and 2 are not in the proper relative positions, is rectified so that the oscillograph will record such deviations both according to their magnitude and to their direction. In the leads or conductors connecting the stator windings 7 and 12 is also connected the instrument 16 responsive to current or voltage, and furthermore the primary of a transformer 20. The currents or voltages induced in the two secondary windings of this transformer are supplied to the grids of two vacuum tubes 21′, 21″ of the type well-known in connection with radio apparatus, and the plate or output circuits of these tubes include the respective primary windings of another transformer 22. The voltage induced in the secondary of transformer 22 is proportional to the voltage arising in the stator windings 7 and 12 when the shafts 1 and 2 are in non-corresponding positions, but is amplified relatively to such voltage. The voltage of the secondary of transformer 22 is supplied to the armature winding of an electric motor 18, the field winding of which is connected to the line receiving alternating current from the source 5. The motor 18 serves to equalize or correct the non-correspondence in the position of the shafts 1 and 2. The armatures or rotors 3, 6, and 11 of the induction regulators or rotary transformers are so positioned that no voltage will be induced in the stator windings 7 and 12 when the position of the transmitter agrees with that of the object 19 to be adjusted. In this case, therefore the motor 18 will receive no current.

If the shafts 1 and 2 are brought out of correspondence, one of them being caused to lag behind the other, for instance by adjusting the transmitter to a different position, voltages are induced in the stator windings 7 and 12, the effects of which are added up in the connecting leads. These voltages are not affected by the rotation voltages induced in the stator windings 7 and 12 by a rapid rotation of the armatures 6 and 11 respectively, since these rotation voltages are opposite and thus cancel each other. The measuring instrument 16, if suitably calibrated, will then indicate very accurately the difference between the positions of the two shafts 1 and 2. The motor 18 then receives current through the amplifier tubes 21′, 21″ until the non-correspondence between the positions of the two shafts 1 and 2 is removed and the object 19 is thus turned by a follow-up movement, into the position coinciding with that of the transmitter.

We claim as our invention:

1. An apparatus for determining and equalizing differences in the positions of two shafts located at a distance apart, comprising a network, a rotary transformer mounted upon one of said shafts, two rotary transformers mounted upon the other shaft, each of said rotary transformers having two relatively movable parts and windings on each of said parts, the windings of one of said parts of the three rotary transformers being connected with each other, the winding of the other part of one of the two transformers mounted on the same shaft being connected to the network and the windings of the other parts of the other two transformers being connected with each other, and voltage-responsive means connected in the connecting leads of the last-mentioned two windings.

2. An apparatus for determining and equalizing differences in the positions of two shafts located at a distance apart, comprising a network, a rotary transformer mounted upon one of said shafts, two rotary transformers mounted upon the other shaft, each of said rotary transformers having two relatively movable parts and windings on each of said parts, the windings of one of said parts of the three rotary transformers being connected with each other, the winding of the other part of one of the two transformers mounted on the same shaft being connected to the network and the windings of the other parts of the other two transformers being connected with each other, and current-responsive means connected in the connecting leads of the last-mentioned two windings.

3. An apparatus for determining and equalizing differences in the positions of two shafts located at a distance apart, comprising a network, a rotary transformer mounted upon one of said shafts, two rotary transformers mounted upon the other shaft, each of said rotary transformers having two relatively movable parts and windings on each of said parts, the windings of one of said parts of the three rotary transformers being connected with each other, the winding of the other part of one of the two transformers mounted on the same shaft being connected to the network and the windings of the other parts of the other two transformers being connected with each other, and an electrical measuring instrument connected in the connecting leads of the last-mentioned two windings.

4. An apparatus for determining and equalizing differences in the positions of two shafts located at a distance apart, comprising a network, a rotary transformer mounted upon one of said shafts, two rotary transformers mounted upon the other shaft, each of said rotary transformers having two relatively movable parts and windings on each of said parts, the windings of one of said parts of the three rotary transformers being connected with each other, the winding of the other part of one of the two transformers mounted on the same shaft being connected to the network and the windings of the other parts of the other two transformers being connected with each other, and an electrical indicating instrument connected in the connecting leads of the last-mentioned two windings.

5. An apparatus for determining and equalizing differences in the positions of two shafts located at a distance apart, comprising a network, a rotary transformer mounted upon one of said shafts, two rotary transformers mounted upon the other shaft, each of said rotary transformers having two relatively movable parts and windings on each of said parts, the windings of one of said parts of the three rotary transformers being connected with each other, the winding of the other part of one of the two transformers mounted on the same shaft being connected to the network and the windings of the other parts of the other two transformers being connected with each other, and an electric motor connected with one of said two shafts, said motor including a winding electrically connected with the connecting leads of the last-mentioned two transformer windings.

6. An apparatus for determining and equalizing differences in the positions of two shafts located at a distance apart, comprising a network, a rotary transformer mounted upon one of said shafts, two rotary transformers mounted upon the other shaft, each of said rotary transformers having two relatively movable parts and windings on each of said parts, the windings of one of said parts of the three rotary transformers being connected with each other, the winding of the other part of one of the two transformers mounted on the same shaft being connected to the network and the windings of the other parts of the other two transformers being connected with each other, and an electric motor connected with one of said two shafts, said motor including a winding electrically connected with the connecting leads of the last-mentioned two transformer windings, and means for amplifying the current flowing through said connecting leads.

7. An apparatus for determining and equalizing differences in the positions of two shafts located at a distance apart, comprising a network, a rotary transformer mounted upon one of said shafts, two rotary transformers mounted upon the other shaft, each of said rotary transformers having two relatively movable parts and windings on each of said parts, the windings of one of said parts of the three rotary transformers being connected with each other, the winding of the other part of one of the two transformers mounted on the same shaft being connected to the network and the windings of the other parts of the other two transformers being connected with each other, and an electrically controlled recording device connected in the connecting leads of the last-mentioned two windings.

8. An apparatus for determining and equalizing differences in the positions of two shafts located at a distance apart, comprising a rotary transformer mounted on one of said shafts, two rotary transformers mounted on the other shaft, windings on the rotors and on the stators of said transformers, the rotor windings of said transformers being connected with each other, means for exciting the stator winding of one of the two rotary transformers mounted on the same shaft, the stator windings of the other two transformers being connected with each other, an electrical measuring instrument and a recording device both connected in the connecting leads of the last-mentioned two stator windings.

In testimony whereof we affix our signatures.

JOHANNES VOPEL.
RUDOLF OETKER.